United States Patent
Li et al.

(10) Patent No.: US 11,390,976 B2
(45) Date of Patent: Jul. 19, 2022

(54) WATER DRAINAGE VALVE FOR DUAL-DRUM CLOTHES WASHING MACHINE, AND DUAL-DRUM CLOTHES WASHING MACHINE USING WATER DRAINAGE VALVE

(71) Applicant: CHONGQING HAIER ROLLER WASHING MACHINE CO., LTD, Chongqing (CN)

(72) Inventors: Wenwei Li, Shandong (CN); Xiao Ning, Shandong (CN); Xinguo Tian, Shandong (CN); Fazhu Liu, Shandong (CN)

(73) Assignee: CHONGQING HAIER ROLLER WASHING MACHINE CO., LTD, Chongqing (CN)

( * ) Notice: Subject to any disclaimer, the term of this patent is extended or adjusted under 35 U.S.C. 154(b) by 349 days.

(21) Appl. No.: 16/605,166

(22) PCT Filed: Apr. 12, 2018

(86) PCT No.: PCT/CN2018/082768
§ 371 (c)(1),
(2) Date: Oct. 14, 2019

(87) PCT Pub. No.: WO2018/188623
PCT Pub. Date: Oct. 18, 2018

(65) Prior Publication Data
US 2021/0102331 A1   Apr. 8, 2021

(30) Foreign Application Priority Data
Apr. 12, 2017   (CN) .......................... 201710242215.8

(51) Int. Cl.
*D06F 31/00*      (2006.01)
*D06F 39/08*      (2006.01)
(Continued)

(52) U.S. Cl.
CPC ............ *D06F 31/00* (2013.01); *D06F 39/083* (2013.01); *F16K 11/166* (2013.01); *F16K 31/528* (2013.01)

(58) Field of Classification Search
CPC ........ D06F 39/083; D06F 31/00; D06F 39/08; F16K 11/166; F16K 31/528; F16K 11/165; F16K 35/027; F16K 15/18
(Continued)

(56) References Cited

U.S. PATENT DOCUMENTS 262,632   A  *   8/1882  Whittaker ............. F16K 11/165
                                                              251/258
701,509   A  *   6/1902  Rylands ............. B60G 17/0525
                                                              137/596.1
(Continued)

FOREIGN PATENT DOCUMENTS

CN       203516840          4/2014
CN       203625679 U        6/2014
(Continued)

OTHER PUBLICATIONS

Chang et al., "Double-drum washing machine", May 2015, CN-104652085-A Machine Translation (Year: 2015).*
(Continued)

*Primary Examiner* — Michael E Barr
*Assistant Examiner* — Thomas Bucci
(74) *Attorney, Agent, or Firm* — Greenberg Traurig

(57) ABSTRACT

Provided are a water drainage valve for a double drum washing machine and a double drum washing machine using the water drainage valve. The water drainage valve includes a first water drainage valve body connected to a first outer drum and a second water drainage valve body connected to a second outer drum, and valve plugs disposed within water drainage valve bodies. The valve plugs include a first valve
(Continued)

plug inside the first water drainage valve body and a second valve plug inside the second water drainage valve body, and a drive assembly connected to the first valve plug and the second valve plug. The drive assembly is configured to drive the first valve plug to move to control the first water drainage valve body to open or close and drive the second valve plug to move to control the second water drainage valve body to open or close. And the first water drainage valve body is in a closed state when the second water drainage valve body is in an open state.

20 Claims, 3 Drawing Sheets

(51) Int. Cl.
  *F16K 11/16* (2006.01)
  *F16K 31/528* (2006.01)
(58) Field of Classification Search
  USPC .................................................. 68/27
  See application file for complete search history.

(56) References Cited

U.S. PATENT DOCUMENTS

| | | | | |
|---|---|---|---|---|
| 766,116 A * | 7/1904 | Rawl et al. | ............ | F15B 13/04 137/868 |
| 1,078,939 A * | 11/1913 | Miller et al. | ............ | F16K 11/18 137/636.1 |
| 1,203,321 A * | 10/1916 | Fosdick | .................. | F16K 11/18 137/636.1 |
| 1,443,539 A * | 1/1923 | Jansen | .................. | F16K 11/166 251/284 |
| 1,553,372 A * | 9/1925 | Grovers | ................ | F16K 11/166 251/284 |
| 1,742,669 A * | 1/1930 | Ross | ..................... | F16K 11/165 137/636.1 |
| 1,840,961 A * | 1/1932 | Kuenzler | ............. | F16K 11/165 137/630.2 |
| 2,076,842 A * | 4/1937 | Henning | ............... | F16K 11/165 210/341 |
| 2,417,158 A * | 3/1947 | Fraser | .................. | F16K 11/165 137/111 |
| 2,464,458 A * | 3/1949 | Newcomer | ........... | F16K 11/165 4/677 |
| 2,504,610 A * | 4/1950 | Wolf | ....................... | F16K 31/58 210/341 |
| 2,800,137 A * | 7/1957 | Fraser | ................ | G05D 23/1313 137/100 |
| 3,128,788 A * | 4/1964 | Millard | .................. | F16K 11/166 251/333 |
| 3,353,554 A * | 11/1967 | Basila | ................... | F16K 11/166 137/868 |
| 3,403,700 A * | 10/1968 | Lionel | ................... | F16K 11/166 137/636.1 |
| 3,638,678 A * | 2/1972 | Symmons | ............. | F16K 11/166 137/636.1 |
| 4,865,078 A * | 9/1989 | Ensign | .................. | F16K 11/166 251/96 |
| 5,398,725 A * | 3/1995 | Nakazawa | ............ | F16K 11/165 137/636.1 |
| 6,206,028 B1 * | 3/2001 | Holden | ................. | F16K 5/0647 137/271 |
| 8,555,923 B1 * | 10/2013 | Minnick | ............... | F16K 5/0642 137/625.19 |
| 2005/0034771 A1 * | 2/2005 | Minnick | ............... | F16K 5/0642 137/625.47 |
| 2006/0117811 A1 | 6/2006 | Kinnetz | | |
| 2010/0139779 A1 * | 6/2010 | Lautzenheiser | ........... | E03C 1/04 137/511 |
| 2015/0021505 A1 * | 1/2015 | Nitta | ..................... | F16K 31/528 251/235 |

FOREIGN PATENT DOCUMENTS

| | | | | |
|---|---|---|---|---|
| CN | 104652085 | | 5/2015 | |
| CN | 104652085 A | * | 5/2015 | ............ D06F 31/00 |
| CN | 104652085 A | | 5/2015 | |
| CN | 105986427 | | 10/2016 | |
| CN | 106939500 A | | 7/2017 | |
| EP | 0235766 A2 | | 9/1987 | |
| EP | 2980300 | | 2/2016 | |
| EP | 2980300 A1 | * | 2/2016 | ........... D06F 39/083 |
| FR | 2742514 A1 | * | 6/1997 | ........... D06F 39/081 |

OTHER PUBLICATIONS

Extended European Search Report, EP18784874.2, dated Nov. 17, 2020.

International Search Report, PCT/CN2018/082768, dated Jul. 18, 2018.

* cited by examiner

WATER DRAINAGE VALVE FOR DUAL-DRUM CLOTHES WASHING MACHINE, AND DUAL-DRUM CLOTHES WASHING MACHINE USING WATER DRAINAGE VALVE

The present application is a national phase application under 35 U.S.C. § 371 of International Patent Application PCT/CN2018/082768, filed on Apr. 12, 2018, which claims priority to Chinese Patent Application No. 201710242215.8, filed on Apr. 12, 2017, the entire disclosures of which applications are hereby incorporated herein by reference.

TECHNICAL FIELD

The present disclosure relates to the field of washing machines and, in particular, to a water drainage valve for a double drum washing machine and a double drum washing machine using the water drainage valve.

BACKGROUND

Currently, for part of commercially available multi-drum washing machines, each drum is provided with a complete water drainage system including one water drainage valve and multiple water drainage systems are arranged inside each multi-drum washing machine, so that the multi-drum washing machine has such a large number of parts with repeated functions and a complicated structure, wasting a space inside the multi-drum washing machine and increasing assembly and production difficulties of the multi-drum washing machine.

For other multi-drum washing machines, multiple drums share a water drainage system controlled by one water drainage valve, but the water drainage system in this structure can only realize that the multiple drums is simultaneously drained or undrained, so that water inside each drum cannot be separately drained and user requirements cannot be satisfied.

SUMMARY

The present disclosure provides a water drainage valve for a double drum washing machine and a double drum washing machine using the water drainage valve, so as to solve the problems in the related art that multiple water drainage systems of a multi-drum washing machine have complicated structures and waste space, and a single water drainage system of the multi-drum washing machine fails to drain water separately out of each outer drum.

Provided is a water drainage valve for a double drum washing machine, including a first water drainage valve body connected to a first outer drum and a second water drainage valve body connected to a second outer drum; a first valve plug inside the first water drainage valve body and a second valve plug inside the second water drainage valve body; and a drive assembly connected to the first valve plug and the second valve plug. The drive assembly is configured to drive the first valve plug to move to control the first water drainage valve body to open or close and drive the second valve plug to move to control the second water drainage valve body to open or close. And the first water drainage valve body is in a closed state when the second water drainage valve body is in an open state.

Further provided is a double drum washing machine, including the water drainage valve described above.

The water drainage valve of the double drum washing machine in the present disclosure can drain water separately out of each outer drum. Compared to a manner that each outer drum is separately provided with a drainage system, the present disclosure can reduce a number of parts, simplify an installation structure, avoid repeated functions of parts inside the double drum washing machine, improve a utilization rate of space inside the washing machine, and reduce assembly and production difficulties of the washing machine.

1. first water drainage valve body; 11. first water inlet; 12. first water outlet; 13. first valve plug; 2. second water drainage valve body; 21. second water inlet; 22. second water outlet; 23. second valve plug; 3. motor; 4. turntable; 41. first arc-shaped guide groove; 42. second arc-shaped guide groove; 5. first pull rod; 6. second pull rod; 51. first pull rod hook; 61. second pull rod hook.

DETAILED DESCRIPTION

Figure 1:
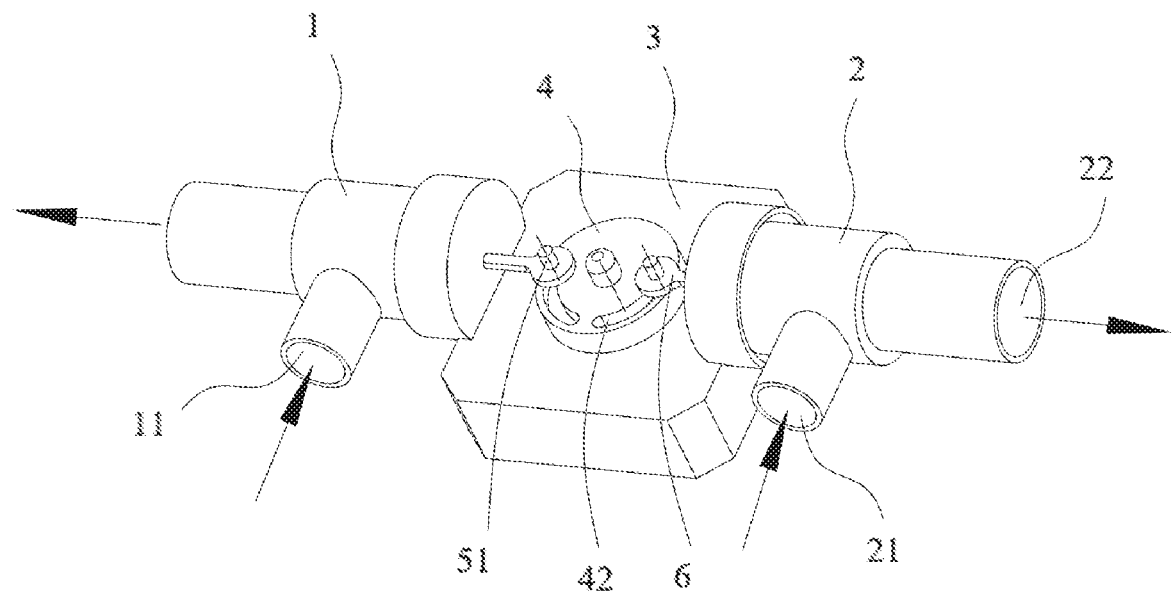
FIG. 1 is a structural schematic diagram of a water drainage valve for a double drum washing machine according to an embodiment.
Figure 2:
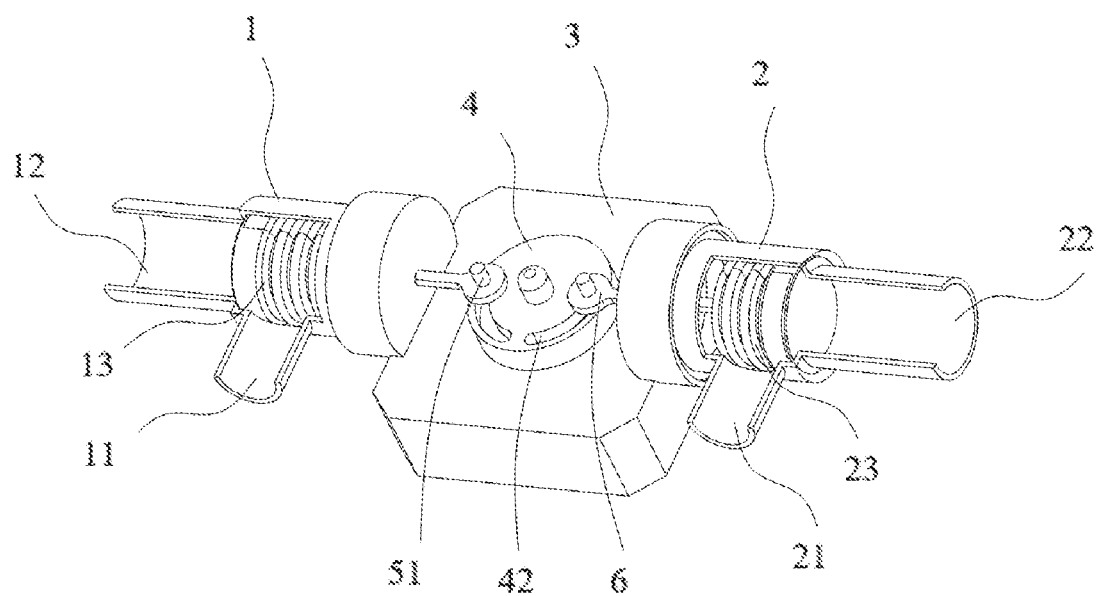
FIG. 2 is a structural schematic diagram of a water drainage valve with valve plugs exposed for a double drum washing machine according to an embodiment.

A water drainage valve for a double drum washing machine is provided by this embodiment. As shown in FIG. 1 and FIG. 2, the water drainage valve for the double drum washing machine includes a first water drainage valve body 1 and a second water drainage valve body 2 which are symmetrically disposed with respect to each other. The first water drainage valve body 1 is provided with a first water inlet 11 and a first water outlet 12, and the second water drainage valve body 2 is provided with a second water inlet 21 and a second water outlet 22. In one embodiment, the first water inlet 11 is connected to a left drum (not shown in the drawings) of the double drum washing machine, and the second water inlet 21 is connected to a right drum of the double drum washing machine. When the first water inlet 11 is intercommunicated with the first water outlet 12, a left outer drum may be drained. When the second water inlet 21 is intercommunicated with the second water outlet 22, a right outer drum may be drained. A first valve plug 13 is disposed between the first water inlet 11 and the first water outlet 12 of the first water drainage valve body 1. The first valve plug 13 is configured to control the first water inlet 11 to be intercommunicated or uncommunicated with the first water outlet 12. A second valve plug 23 is disposed between the second water inlet 21 and the second water outlet 22 of the second water drainage valve body 2. The second valve plug 23 is configured to control the second water inlet 21 to be intercommunicated or uncommunicated with the second water outlet 22. In one embodiment, the first valve plug 13 and the second valve plug 23 are connected to a same drive assembly. The drive assembly may drive the first valve plug 13 to move to control the first water inlet 11 to be intercommunicated with or uncommunicated with the first water outlet 12.

In one embodiment, when the first valve plug 13 is driven to move to a position where the first water inlet 11 is intercommunicated with the first water outlet 12, the first water inlet 11 is uncommunicated with the first water outlet 12, that is, water cannot be drained from the first water outlet 12. When the first valve plug 13 is driven to move away from the position where the first water inlet 11 is intercommunicated with the first water outlet 12, the first water inlet 11 is intercommunicated with the first water outlet 12, and the water may enter into the first water inlet 11 and be drained from the first water outlet 12.

In one embodiment, when the second valve plug 23 is driven to move to a position where the second water inlet 21 is intercommunicated with the second water outlet 22, the second water inlet 21 is uncommunicated with the second water outlet 22, that is, water cannot be drained from the second water outlet 22. When the second valve plug 23 is driven to move away from the position where the second water inlet 21 is intercommunicated with the second water outlet 22, the second water inlet 21 is intercommunicated with the second water outlet 22, and the water may enter into the second water inlet 21 and be drained from the second water outlet 22.

In this embodiment, when the first water inlet 11 is intercommunicated with the first water outlet 12, the first valve plug 13 moves towards the drive assembly. When the second water inlet 21 is intercommunicated with the second water outlet 22, the second valve plug 23 moves towards the drive assembly.

When the drive assembly drives the first valve plug 13 to move, the second valve plug 23 is in a stationary state; when the drive assembly drives the second valve plug 23 to move, the first valve plug 13 is in a stationary state. That is, when the first water inlet 11 is intercommunicated with the first water outlet 12 of the first water drainage valve body 1, the second water inlet 21 is uncommunicated with the second water outlet 22 of the second water drainage valve body 2; when the second water inlet 21 is intercommunicated with the second water outlet 22 of the second water drainage valve body 2, the first water inlet 11 is uncommunicated with the first water outlet 12 of the first water drainage valve body 1.

In one embodiment, the drive assembly includes a motor 3. A turntable 4 is secured to an output end of the motor 3. The turntable 4 is provided with a first arc-shaped guide groove 41 and a second arc-shaped guide groove 42 symmetrically disposed with respect to each other. The first arc-shaped guide groove 41 and the second arc-shaped guide groove 42 are disposed on a same side of a center of the turntable 4, and a center of the first arc-shaped guide groove 41 and a center of the second arc-shaped guide groove 42 each coincide with the center of the turntable 4. A first pull rod 5 is mounted within the first arc-shaped guide groove 41, and a second pull rod 6 is mounted within the second arc-shaped guide groove 42. The first pull rod 5 and the second pull rod 6 are symmetrically disposed. One end of the first pull rod 5 is provided with a first pull rod hook 51, and the first pull rod hook 51 is disposed within the first arc-shaped guide groove 41 and movable within the first arc-shaped guide groove 41. The other end of the first pull rod 5 without the first pull rod hook 51 penetrates through the first water drainage valve body 1 and is connected to the first valve plug 13 inside the first water drainage valve body 1. One end of the second pull rod 6 is provided with a second pull rod hook 61. The second pull rod hook 61 is disposed within the second arc-shaped guide groove 42 and movable within the second arc-shaped guide groove 42. The other end of the second pull rod 6 without the second pull rod hook 61 penetrates through the second water drainage valve body 2 and is connected to the second valve plug 23 inside the second water drainage valve body 2.

When the first water inlet 11 is uncommunicated with the first water outlet 12 of the first water drainage valve body 1 and the second water inlet 21 is uncommunicated with the second water outlet 22 of the second water drainage valve body 2, a center of the first pull rod hook 51 of the first pull rod 5, a center of the second pull rod hook 61 of the second pull rod 6 and the center of the turntable 4 are located on a same straight line.

In one embodiment, when the motor 3 drives the turntable 4 to rotate, the first arc-shaped guide groove 41 drives the first pull rod hook 51 within the first arc-shaped guide groove 41 to move, at this moment, the first pull rod hook 51 drives the first pull rod 5 connected to the first pull rod hook 51 to rotate along with the turntable 4, and the first pull rod 5 drives the first valve plug 13 to move towards the turntable 4, so that the first water inlet 11 is intercommunicated with the first water outlet 12 of the first water drainage valve body 1 where the first valve plug 13 is located. The second pull rod hook 61 within the second arc-shaped guide groove 42 is not driven by the second arc-shaped guide groove 42 to move, that is, the second valve plug 23 connected to the second pull rod 6 connected to the second pull rod hook 61 is not driven to move, so that the second water inlet 21 is uncommunicated with the second water outlet 22 of the second water drainage valve body 2 where the second valve plug 23 is located. That is, when the turntable 4 in this embodiment rotates, the turntable 4 only drives one of the pull rods to move, thereby achieving separate intercommunication between a water inlet and a water outlet of the two water drainage valve bodies, that is, separately draining water out of each drum of the double drum washing machine.

In this embodiment, the first water inlet 11 and the first water outlet 12 of the first water drainage valve body 1 are perpendicular to each other, so that the first valve plug 13 may control the first water inlet 11 to be intercommunicated or uncommunicated with the first water outlet 12. And the second water inlet 21 and the second water outlet 22 of the second water drainage valve body 2 are perpendicular to each other, so that the second valve plug 23 may control the second water inlet 21 to be intercommunicated or uncommunicated with or the second water outlet 22, achieving smoother water drainage.

In this embodiment, the motor 3 may rotate in two directions to generate three positional states. That is, when two drums of the double drum washing machine are drained separately, the first water inlet 11 is intercommunicated with the first water outlet 12 of the first water drainage valve body 1 and the second water inlet 21 is uncommunicated with the second water outlet 22 of the second water drainage valve body 2, or the first water inlet 11 is uncommunicated with the first water outlet 12 of the first water drainage valve body 1 and the second water inlet 21 is intercommunicated with the second water outlet 22 of the second water drainage valve body 2; when the two drums are not drained, the first water inlet 11 is uncommunicated with the first water outlet 12 of the first water drainage valve body 1 and the second water inlet 21 is uncommunicated with the second water outlet 22 of the second water drainage valve body 2.

In one embodiment, the water drainage valve for the double drum washing machine in this embodiment has working states described below.

Figure 3:
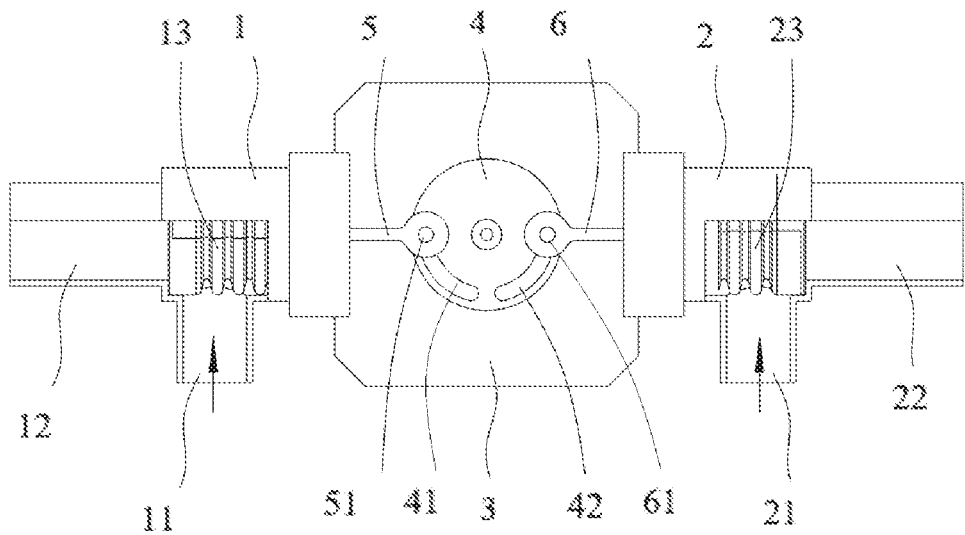
FIG. 3 is a schematic diagram of a state of a water drainage valve when two drums of a double drum washing machine each are not drained according to an embodiment.

As shown in FIG. 3, when the double drum washing machine is in a non-drainage state, the first water inlet 11 is uncommunicated with the first water outlet 12 of the first water drainage valve body 1 of the water drainage valve, and the second water inlet 21 is uncommunicated with the second water outlet 22 of the second water drainage valve body 2, so that neither of the two drums is drained.

Figure 4:
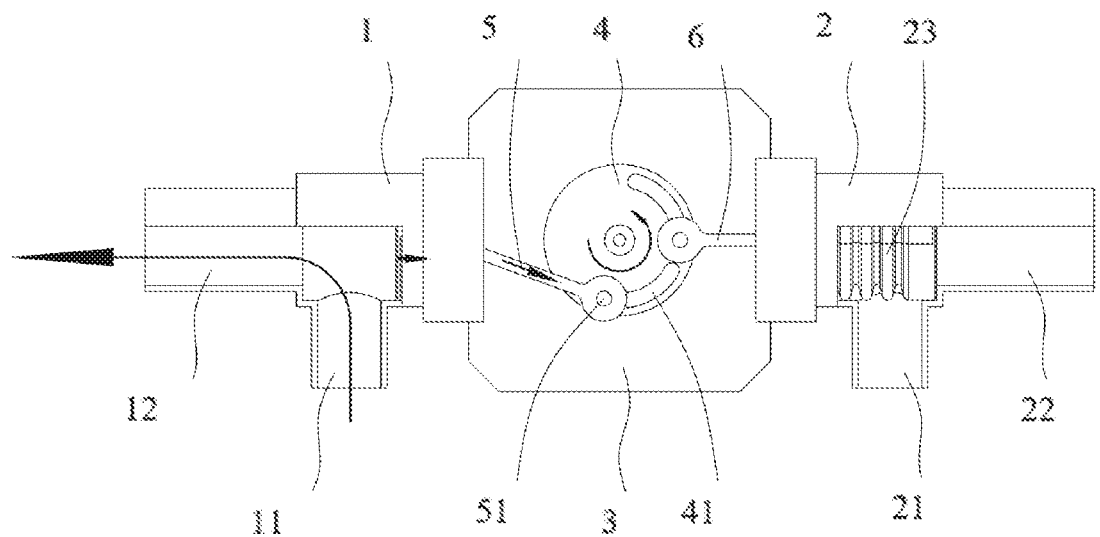
FIG. 4 is a schematic diagram of a state of a water drainage valve when a left drum of a double drum washing machine is drained according to an embodiment.

As shown in FIG. 4, when one drum needs to be drained, for example, the one drum is connected to the first water inlet 11 of the left first water drainage valve body 1 shown in FIG. 4, and the motor 3 rotates counterclockwise and drives the first valve plug 13 of the first water drainage valve body 1 to move to enable the first water inlet 11 to be intercommunicated with the first water outlet 12 of the first water drainage valve body 1 until the motor 3 rotates to a position shown in FIG. 4. At this moment, water in the one drum begins to be drained and the state is maintained until the water in the one drum has been drained. Then the motor 3 rotates clockwise and drives the first valve plug 13 to move to uncommunicate the first water inlet 11 with the first water outlet 12 of the left first water drainage valve body 1. At this time, the one drum stops being drained and the first valve plug 13 returns to its initial position. In this process, the second pull rod 6 connected to the second valve plug 23 inside the right second water drainage valve body 2 only slides with respect to the turntable 4 and is not driven, so that the second valve plug 23 inside the right second water drainage valve body 2 always disconnects the second water inlet 21 from the second water outlet 22 of the right second water drainage valve body 2.

Figure 5:
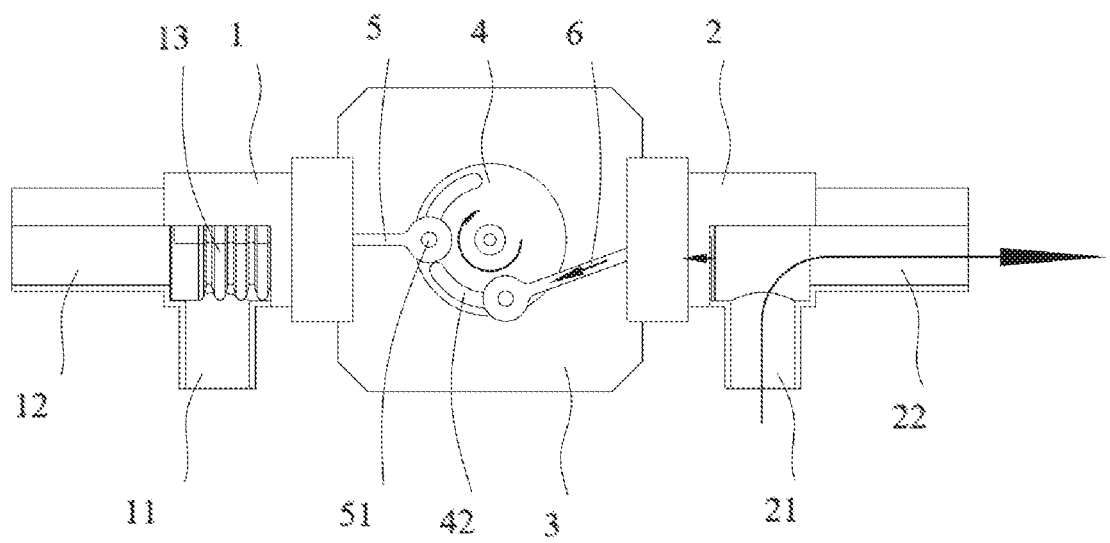
FIG. 5 is a schematic diagram of a state of a water drainage valve when a right drum of a double drum washing machine is drained according to an embodiment.

As shown in FIG. 5, when the right drum needs to be drained, the second water inlet 21 needs to be intercommunicated with the second water outlet 22 of the right second water drainage valve body 2, and the motor 3 rotates clockwise and drives the second valve plug 23 of the right second water drainage valve body 2 to move to enable the second water inlet 21 to be intercommunicated with the second water outlet 22 of the right second water drainage valve body 2 until the motor 3 rotates to a position shown in FIG. 5. At this moment, water in the right drum begins to be drained and the state is maintained until the water in the right drum has been drained. Then the motor 3 rotates counterclockwise and drives the second valve plug 23 to move to uncommunicate the second water inlet 21 with the second water outlet 22 of the right second water drainage valve body 2. At this moment, the right drum stops being drained and the second valve plug 23 returns to its initial position. In this process, the first pull rod 5 connected to the first valve plug 13 inside the left first water drainage valve body 1 only slides with respect to the turntable 4 and is not driven, so that the first valve plug 13 inside the left first water drainage valve body 1 always uncommunicates the first water inlet 11 with the first water outlet 12 of the left first water drainage valve body 1.

It should be noted that in this embodiment, when the first water drainage valve body 1 of the water drainage valve opens or closes, the first pull rod hook 51 of the first pull rod 5 should always move within the first arc-shaped guide groove 41 of the turntable 4, and an arc length of the first arc-shaped guide groove 41 should ensure that the first valve plug 13 is fully opened (that is, the first water inlet 11 is fully intercommunicated with the first water outlet 12). When the second water drainage valve body 2 of the water drainage valve opens or closes, the second pull rod hook 61 of the second pull rod 6 should always move within the second arc-shaped guide groove 42 of the turntable 4, and an arc length of the second arc-shaped guide groove 42 should ensure that the second valve plug 23 is fully opened (that is, the second water inlet 21 is fully intercommunicated with the second water outlet 22).

A double drum washing machine includes the above-mentioned water drainage valve through which outer drums can be separately drained.

INDUSTRIAL APPLICABILITY

The water drainage valve for a double drum washing machine in the present disclosure solves the problem in the related art that multiple water drainage systems of a multi-drum washing machine have complicated structures and waste space, and a single water drainage system of the multi-drum washing machine fails to drain water separately out of each outer drum.

What is claimed is:

1. A water drainage valve for a double drum washing machine comprising a first outer drum and a second outer drum, comprising:
   a first water drainage valve body connected to the first outer drum of the double drum washing machine and a second water drainage valve body connected to the second outer drum of the double drum washing machine;
   a first valve plug inside the first water drainage valve body and a second valve plug inside the second water drainage valve body; and
   a drive assembly connected to the first valve plug and the second valve plug, wherein the drive assembly is configured to drive the first valve plug to move so as to control the first water drainage valve body to open or close and drive the second valve plug to move so as to control the second water drainage valve body to open or close; and the first water drainage valve body is in a closed state when the second water drainage valve body is in an open state;
   the first water drainage valve body is provided with a first water inlet and a first water outlet, the first valve plug is disposed between the first water inlet and the first water outlet, and the drive assembly is configured to drive the first valve plug to move so as to control the first water inlet to be intercommunicated or uncommunicated with the first water outlet;
   the second water drainage valve body is provided with a second water inlet and a second water outlet, the second valve plug is disposed between the second water inlet and the second water outlet, and the drive assembly is configured to drive the second valve plug to move so as to control the second water inlet to be intercommunicated or uncommunicated with the second water outlet; and
   the drive assembly comprises a motor, a turntable secured to an output end of the motor, a first pull rod connected to the first valve plug, and a second pull rod connected to the second valve plug; wherein
   the turntable is configured to, in condition that the turntable rotates counterclockwise, only drive the first pull rod to move, so that the first pull rod drives the first valve plug connected to the first pull rod to move so as to control the first water inlet to be intercommunicated with the first water outlet.

2. The water drainage valve for a double drum washing machine of claim 1, wherein the drive assembly is configured to drive the first valve plug to move so as to control the first water drainage valve body to open or close and drive the second valve plug to move so as to control the second water drainage valve body to open or close; and the second water drainage valve body is in a closed state when the first water drainage valve body is in an open state.

3. The water drainage valve for a double drum washing machine of claim 1, wherein the turntable is configured to, in condition that the turntable rotates clockwise, only drive the second pull rod to move, so that the second pull rod drives the second valve plug connected to the second pull rod to move so as to control the second water inlet to be intercommunicated with the second water outlet.

4. The water drainage valve for a double drum washing machine of claim 1, wherein the turntable is provided with a first arc-shaped guide groove and a second arc-shaped guide groove symmetrically disposed with respect to each other, the first arc-shaped guide groove and the second arc-shaped guide groove are disposed on a same side of a center of the turntable, one end of the first pull rod is disposed within the first arc-shaped guide groove and movable when driven by the first arc-shaped guide groove, and one end of the second pull rod is disposed within the second arc-shaped guide groove and movable when driven by the second arc-shaped guide groove.

5. The water drainage valve for a double drum washing machine of claim 4, wherein the first arc-shaped guide groove, the second arc-shaped guide groove and the turntable are concentrically arranged.

6. The water drainage valve for a double drum washing machine of claim 5, wherein the one end of the first pull rod within the first arc-shaped guide groove is provided with a first pull rod hook, and the first pull rod hook is disposed within the first arc-shaped guide groove and movable within the first arc-shaped guide groove; and the one end of the second pull rod within the second arc-shaped guide groove is provided with a second pull rod hook, and the second pull rod hook is disposed within the second arc-shaped guide groove and movable within the second arc-shaped guide groove.

7. The water drainage valve for a double drum washing machine of claim 6, wherein when the first water drainage valve body and the second water drainage valve body each are in the closed state, a center of the first pull rod hook, a center of the second pull rod hook, and the center of the turntable are located on a same straight line.

8. The water drainage valve for a double drum washing machine of claim 7, wherein the second pull rod hook within the second arc-shaped guide groove is configured to not move in condition that the first arc-shaped guide groove drives the first pull rod hook within the first arc-shaped guide groove to move.

9. The water drainage valve for a double drum washing machine of claim 7, wherein the first pull rod hook within the first arc-shaped guide groove is configured to not move in condition that the second arc-shaped guide groove drives the second pull rod hook within the second arc-shaped guide groove to move.

10. The water drainage valve for a double drum washing machine of claim 1, wherein the first water inlet and the first water outlet of the first water drainage valve body are perpendicular to each other; and the second water inlet and the second water outlet of the second water drainage valve body are perpendicular to each other.

11. The water drainage valve for a double drum washing machine of claim 3, wherein the turntable is provided with a first arc-shaped guide groove and a second arc-shaped guide groove symmetrically disposed with respect to each other, the first arc-shaped guide groove and the second arc-shaped guide groove are disposed on a same side of a center of the turntable, one end of the first pull rod is disposed within the first arc-shaped guide groove and movable when driven by the first arc-shaped guide groove, and one end of the second pull rod is disposed within the second arc-shaped guide groove and movable when driven by the second arc-shaped guide groove.

12. The water drainage valve for a double drum washing machine of claim 2, wherein the first water inlet and the first water outlet of the first water drainage valve body are perpendicular to each other; and the second water inlet and the second water outlet of the second water drainage valve body are perpendicular to each other.

13. A double drum washing machine, comprising a first outer drum, a second outer drum, and a water drainage valve, wherein the water drainage valve comprises:
   a first water drainage valve body connected to the first outer drum and a second water drainage valve body connected to the second outer drum;
   a first valve plug inside the first water drainage valve body and a second valve plug inside the second water drainage valve body; and
   a drive assembly connected to the first valve plug and the second valve plug, wherein the drive assembly is configured to drive the first valve plug to move so as to control the first water drainage valve body to open or close and drive the second valve plug to move so as to control the second water drainage valve body to open or close; and the first water drainage valve body is in a closed state when the second water drainage valve body is in an open state;
   the first water drainage valve body is provided with a first water inlet and a first water outlet, the first valve plug is disposed between the first water inlet and the first water outlet, and the drive assembly is configured to drive the first valve plug to move so as to control the first water inlet to be intercommunicated or uncommunicated with the first water outlet;
   the second water drainage valve body is provided with a second water inlet and a second water outlet, the second valve plug is disposed between the second water inlet and the second water outlet, and the drive assembly is configured to drive the second valve plug to move so as to control the second water inlet to be intercommunicated or uncommunicated with the second water outlet; and
   the drive assembly comprises a motor, a turntable secured to an output end of the motor, a first pull rod connected to the first valve plug, and a second pull rod connected to the second valve plug; wherein
   the turntable is configured to, in condition that the turntable rotates counterclockwise, only drive the first pull rod to move, so that the first pull rod drives the first valve plug connected to the first pull rod to move so as to control the first water inlet to be intercommunicated with the first water outlet.

14. The double drum washing machine of claim 13, wherein the drive assembly is configured to drive the first valve plug to move to control the first water drainage valve body to open or close and drive the second valve plug to move to control the second water drainage valve body to open or close; and the second water drainage valve body is in a closed state when the first water drainage valve body is in an open state.

15. The double drum washing machine of claim 13, wherein the turntable is configured to, in condition that the turntable rotates clockwise, only drive the second pull rod to move, so that the second pull rod drives the second valve plug connected to the second pull rod to move so as to control the second water inlet to be intercommunicated with the second water outlet.

16. The double drum washing machine of claim 13, wherein the turntable is provided with a first arc-shaped guide groove and a second arc-shaped guide groove symmetrically disposed with respect to each other, the first arc-shaped guide groove and the second arc-shaped guide groove are disposed on a same side of a center of the turntable, one end of the first pull rod is disposed within the first arc-shaped guide groove and movable when driven by the first arc-shaped guide groove, and one end of the second pull rod is disposed within the second arc-shaped guide groove and movable when driven by the second arc-shaped guide groove.

17. The double drum washing machine of claim 16, wherein the first arc-shaped guide groove, the second arc-shaped guide groove and the turntable are concentrically arranged.

18. The double drum washing machine of claim 17, wherein the one end of the first pull rod within the first arc-shaped guide groove is provided with a first pull rod hook, and the first pull rod hook is disposed within the first arc-shaped guide groove and movable within the first arc-shaped guide groove; and the one end of the second pull rod within the second arc-shaped guide groove is provided with a second pull rod hook, and the second pull rod hook is disposed within the second arc-shaped guide groove and movable within the second arc-shaped guide groove.

19. The double drum washing machine of claim 18, wherein when the first water drainage valve body and the second water drainage valve body each are in the closed state, a center of the first pull rod hook, a center of the second pull rod hook, and the center of the turntable are located on a same straight line.

20. The double drum washing machine of claim 19, wherein the second pull rod hook within the second arc-shaped guide groove is configured to not move in condition that the first arc-shaped guide groove drives the first pull rod hook within the first arc-shaped guide groove to move.

* * * * *